United States Patent
Sugita et al.

(10) Patent No.: US 6,693,891 B1
(45) Date of Patent: Feb. 17, 2004

(54) COMMUNICATION CONTROL METHOD AND TRANSMISSION UNIT

(75) Inventors: Takehiro Sugita, Kanagawa (JP); Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/252,807

(22) Filed: Feb. 19, 1999

(30) Foreign Application Priority Data

Feb. 27, 1998 (JP) ............................... P10-047416

(51) Int. Cl.⁷ ................................................ H04J 3/00
(52) U.S. Cl. .................. 370/345; 370/329; 370/336; 370/350
(58) Field of Search ................... 370/503, 509, 370/510, 512, 513, 514, 478, 442, 350, 347, 348, 349, 345, 336, 337, 329, 341, 328

(56) References Cited

U.S. PATENT DOCUMENTS

| 4,549,293 A | * | 10/1985 | Christian et al. | ........... 370/347 |
| 4,641,304 A | * | 2/1987 | Raychaudhuri | ............ 370/447 |
| 5,278,835 A | * | 1/1994 | Ito et al. | ...................... 370/311 |
| 5,636,243 A | * | 6/1997 | Tanaka | ........................ 375/219 |
| 5,917,813 A | * | 6/1999 | Van Driel et al. | .......... 370/348 |
| 5,933,418 A | * | 8/1999 | Massingill et al. | ......... 370/321 |
| 5,959,983 A | * | 9/1999 | Saito et al. | .................. 370/337 |
| 6,115,612 A | * | 9/2000 | Fukuda | ........................ 455/517 |
| 6,172,971 B1 | * | 1/2001 | Kim | ............................ 370/348 |
| 6,275,506 B1 | * | 8/2001 | Fazel et al. | ................. 370/478 |

FOREIGN PATENT DOCUMENTS

| JP | 2241137 | 9/1990 |
| JP | 4360324 | 12/1992 |

* cited by examiner

Primary Examiner—Hassan Kizou
Assistant Examiner—Saba Tsegaye
(74) Attorney, Agent, or Firm—Jay H. Maioli (57) ABSTRACT

A communication control method and a communication system, in which the transmission efficiency, in a network system is improved in the case where the communication in the network system is controlled by a control station. A management data transmission area is set in a frame period, and a plurality of slots are arranged in the management data transmission area. Data on the communication condition of each station are individually transmitted by each of a plurality of communication stations or the control station in each of the slots.

12 Claims, 8 Drawing Sheets

FIG. 4A Frame Structure

FIG. 4B Management Area Structure

FIG. 6

A Frame Sync Transmission
B Transmission from Node 1
C Transmission from Node 2
D Transmission from Node 3
E Transmission from Node 4
F Transmission from Node 5
G Transmission from Node 6

|        | Node 1 | Node 2 | Node 3 | Node 4 | Node 5 | Node 6 | Node 7 | Node 8 |
|--------|--------|--------|--------|--------|--------|--------|--------|--------|
| Node 1 |        | ○      | ○      | ✕      | ✕      | ✕      | ○      | —      |
| Node 2 |        |        | ✕      | ○      | ✕      | ✕      | ○      | —      |
| Node 3 |        |        |        | ✕      | ○      | ✕      | ○      | —      |
| Node 4 |        |        |        |        | ✕      | ○      | ○      | —      |
| Node 5 |        |        |        |        |        | ✕      | ○      | —      |
| Node 6 |        |        |        |        |        |        | ○      | —      |
| Node 7 |        |        |        |        |        |        |        | —      |
| Node 8 |        |        |        |        |        |        |        |        | ved a communication control method in which a manage-
COMMUNICATION CONTROL METHOD AND TRANSMISSION UNIT

BACKGROUND OF THE INVENTION

1. Field of the Invention

The present invention relates to a communication control method suitably applied to a local area network (LAN) configured of a plurality of devices for transmitting various information by radio signals, for example, and a transmission unit using such a control method.

2. Description of the Related Art

In a conventional local area network constructed to transmit data between a plurality of devices such as various video devices or between a personal computer and peripheral devices thereof within a comparatively small area such as a residential house, an office or the like, upon assembling a local area network, the devices are sometimes connected with a radio signal transceiver (radio transmission unit) connected to each device to permit data transmission by radio without directly connecting the devices by some signal lines.

In the case where a local area network is constructed by radio transmission, the respective component devices are not required to be connected directly with signal lines or the like and therefore the system configuration can be simplified.

Assume that a local area network is constructed by a plurality of radio transmission units. In the case where signals are transmitted at the same time from a plurality of the transmission units using the same transmission band, there is a possibility that a transmission error is liable to occur. Therefore, each communication between the transmission units in the network is required to be accessed and controlled by some method.

In a conventionally well-known access control method such as a small-scale radio network, for example, the communication between the transmission units (nodes) within the network is one-dimensionally managed by a transmission unit (root node) arranged at the central portion of a star-connected configuration. A conventional general method for avoiding a conflict in such a network is a band reservation method in which a band is reserved for each transmission line regardless of the presence or absence of transmission data and the transmission is conducted in the reserved band. With this method, however, it is necessary to secure a band of the transmission line even when the data to be transmitted is lacking, and the network resources are used wastefully and the problem of very low efficiency is posed.

An access method that has solved this problem is the communication conducted by polling control within a network. In this method, one arbitrary transmission unit in the network is determined as a control station (root node) which transmits a control signal for polling the other nodes sequentially in the network, and a signal is transmitted from each node sequentially by polling. The transmission processing by polling can improve the transmission efficiency.

Even a configuration for carrying out the access control by polling poses the problem of a deteriorated transmission efficiency in the case where transmission units (nodes) in the network increase in number. Specifically, as long as the number of nodes in the network is small, all the nodes can be polled sequentially without any serious problem. Assuming that a multiplicity of nodes exist within a network and only a small number of them have transmission data, however, the amount of polling the nodes having no transmission data increases and only many control signals for polling are transmitted. Thus, the transmission efficiency of the network is lowered, and the root node is required to transmit a multiplicity of control signals for polling, thereby imposing a heavy burden on the root node.

In the case where the nodes in the network are portable, on the other hand, the root node is required to manage the movement of the nodes. Therefore, each node is required to send a signal in response to the polling by the root node. With a configuration in which a response signal to the polling is required to be sent back always, even the nodes having no transmission data always require the communication processing for responding to the polling, thereby increasing the power consumption of each node.

SUMMARY OF THE INVENTION

An object of the present invention is to efficiently control the communication within a network system by a control station.

According to one aspect of the invention, there is provided a communication control method in which a management data transmission area is set in a frame period, a plurality of slots are arranged in the management data transmission area, and a plurality of communication stations or a control station are adapted to transmit individual data on the communication condition of the respective station in the respective slots.

The communication control method according to the present invention makes it possible to collect data on the communication conditions in each communication station for the communication using the management data transmission area.

According to another aspect of the invention, there is provided a transmission unit comprising a receiving means for receiving signals transmitted from other transmission units in respective slots set within the management data transmission area and a transmission means for transmitting the data concerning the receiving conditions of respective slots in the receiving means from predetermined ones of a plurality of slots as data concerning the receiving conditions.

With a transmission unit according to the invention, signals can be processed for receiving from other transmission units and the data concerning the communication conditions can be processed for transmission based on the receiving conditions of the received signals using the management data transmission area.

DETAILED DESCRIPTION OF THE PREFERRED EMBODIMENTS

A first embodiment of the present invention will be explained below with reference to FIGS. 1 to 10.

Figure 1:
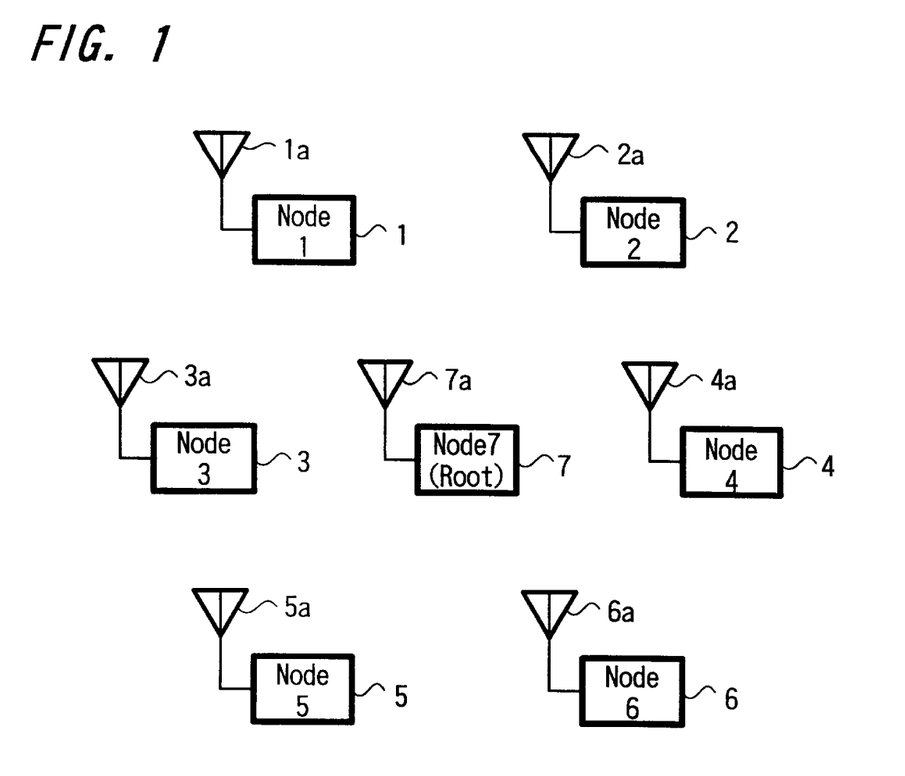
FIG. 1 is an arrangement diagram showing a configuration of an example of a communication system according to a first embodiment of the present invention.

This embodiment represents an application of the invention to a network system configured for transmission and receiving of video data, audio data, computer data and the like within a home, a comparatively small office or the like. First, the system configuration of this example will be explained with reference to FIG. 1. The network system of the example is adapted to constitute a network with a maximum of 16 radio transmission units. FIG. 1 shows the arrangement of seven radio transmission units 1 to 7 out of the 16 units. The respective radio transmission units 1 to 7 are connected with antennas 1a to 7a, respectively, for transmitting and receiving. The radio transmission units 1 to 7 are also each connected with various processing devices (not shown) including a video signal reproduction device, a monitor device, a computer device, a printer device and the like. Data are transmitted, when required, between these processing devices through the radio transmission units connected therewith. The seven radio transmission units 1 to 7 function as nodes constituting communication stations and assigned addresses individually as first to seventh nodes.

In this embodiment, an arbitrary one of the radio transmission units in the network system is set as a root node functioning as a control station, and the system is configured to carry out the radio communication between the nodes under the polling control of the root node. The root node is basically made up of a radio transmission unit arranged at a position where it can directly communicate by radio with all the other nodes within the system. In the shown example, the radio transmission unit 7 (seventh node) arranged at substantially the center of the network system is set as a root node. This system constitutes what is called a star-connected network in which the central root node controls the other nodes around it.

Figure 2:
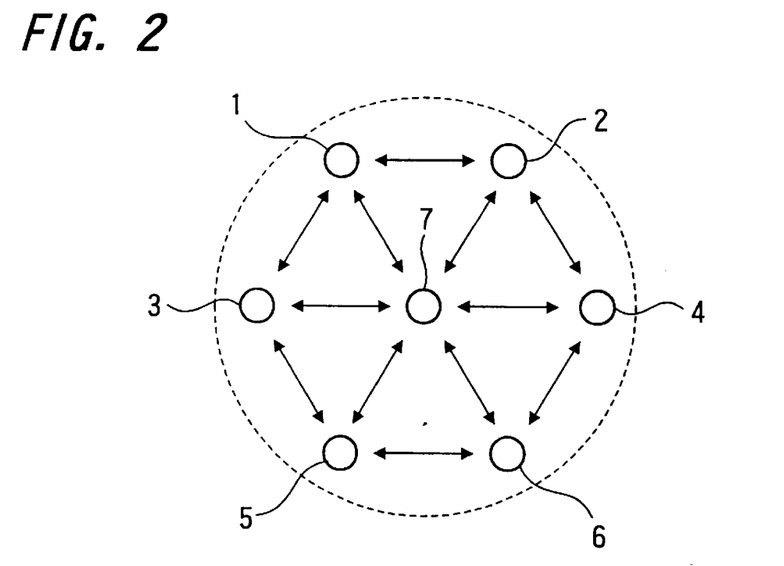
FIG. 2 is a diagram for explaining an example of a physical topology map according to the first embodiment of the invention.

FIG. 2 is a physical topology map showing the communication conditions between the nodes arranged as in the present embodiment. The nodes connected by arrows can communicate with each other directly. Basically, the nodes 1 to 7 can directly communicate only with adjacent nodes. For example, the first node 1 can communicate directly only with the second node 2, the third node 3 and the seventh node 7 arranged around the first node 1. This is also the case with the other nodes. The seventh node 7 constituting the root node located at almost the center, for example, is adjacent to all the other nodes 1 to 6, and therefore can communication directly with all the other nodes 1 to 6. Nodes incapable of direct communication with each other can communicate with each other by transmitting data through other nodes.

Figure 3:
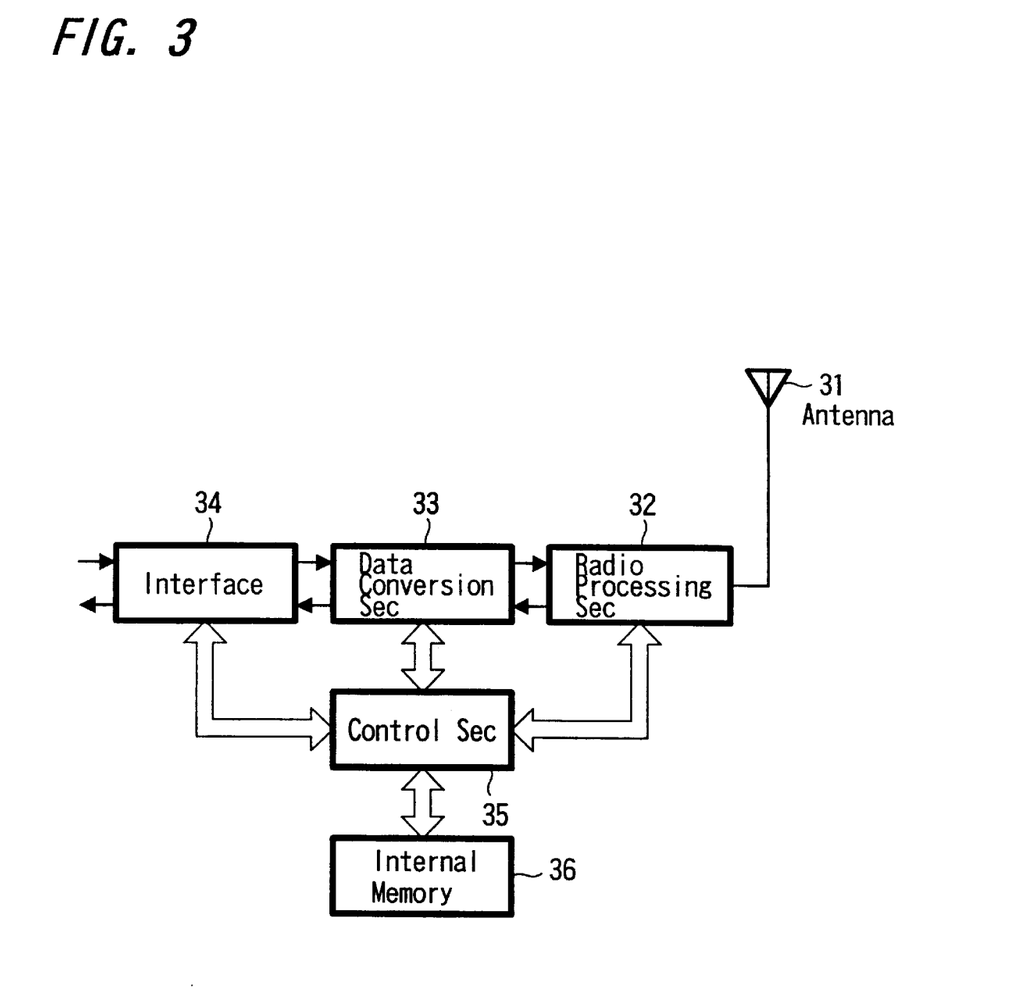
FIG. 3 is a block diagram showing an example configuration of a transmission unit according to the first embodiment of the invention.

An example configuration of each of the radio transmission units 1 to 7 constituting the nodes is shown in FIG. 3. The radio transmission units 1 to 7 have basically a common configuration (except for the root node which has a different control configuration from other nodes). Each node includes an antenna 31 for transmission and receiving, and a. radio processing section 32 connected to the antenna 31 for processing the radio transmission and radio receiving to and from other transmission units. In this case, the signals transmitted and received by the radio processing section 32 use a very high frequency band (say, 5 GHz band, for example,). Also, in this embodiment, a comparatively weak transmission output is set as a transmission output. For indoor application, for example, the output is set to a level permitting radio transmission over a comparatively short distance of up to several to several tens of meters.

Each node further includes a data conversion section 33 for converting the data of the signal received by the radio processing section 32 and the data of the signal transmitted by the radio processing section 32. The data converted by the data conversion section 33 are supplied to a processing device connected through an interface section 34. At the same time, the data supplied from the processing device connected thereto are supplied to the data conversion section 33 through the interface section 34 for conversion processing.

The internal parts of the radio transmission unit are configured to execute the processing under the control of a control section 35 including a microcomputer or the like. In the case where the signal received by the radio processing section 32 is a control signal, the received control signal is supplied through the data conversion section 33 to the control section 35. The control section 35 then sets all the parts into the state designated by the received control signal. The control signal transmitted from the control section 35 to other transmission units is also supplied from the control section 35 to the radio processing section 32 through the data conversion section 33 for radio transmission. In the case where the received signal is a sync (synchronizing) signal, on the other hand, the receiving timing of the sync signal is determined by the control section 35, and a frame period is set based on the sync signal, so that the communication is controlled with the frame period thus set. Also, the control section 35 is connected with an internal memory 36 for temporarily storing data required for the communication control.

Figure 4A:
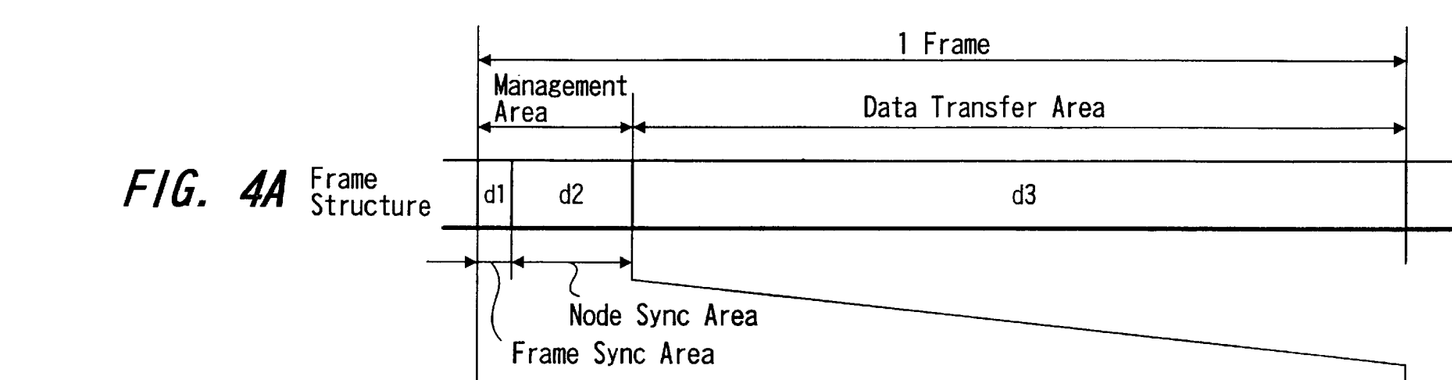
FIGS. 4A and 4B are each a diagram for explaining an example configuration of the transmission data according to the first embodiment of the invention.
Figure 4B:
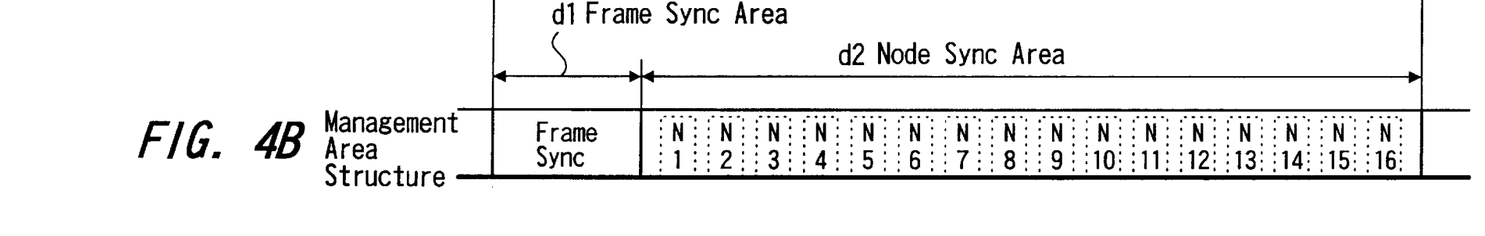

FIGS. 4A and 4B each show a structure of the signals transmitted between the nodes (the radio transmission units 1 to 7) in the network system of this embodiment. In this example, data are transmitted by defining a frame period. Specifically, as shown in FIG. 4A, a predetermined period is set as one frame period. The frame period includes at the head thereof a predetermined period of frame sync area d1 and a predetermined period of a node sync area d2 constituting a management data transmission area, respectively, and the remaining period is set as a data transfer (transmission) area d3. In the frame sync area d1, as shown in FIG. 4B, a frame sync signal is transmitted from the root node. This frame sync signal is received by other nodes, and with reference to the timing of receiving the particular sync signal, the frame periods of all the nodes are set. The frame sync signal is configured of data consisting of a predetermined number of bits and assigned an ID (identification) number data unique to the network system, for example.

A predetermined number (16 in this case) of slots are equidistantly set in the node sync area d2. The 16 slots in each frame are assigned to the 16 nodes, respectively, constituting the network system. The leading slot is assigned as a slot N1 for the first node, a slot N2 for the second node, . . . , a slot N16 for the 16th node, for example. Slots N1 to N16 assigned to the respective nodes are each configured to transmit a node sync signal from a corresponding node. In the example under consideration in which a network system is configured of seven nodes, the slots N1 to N7 are used but the slot N8 and subsequent slots are not used (i.e. no data are transmitted). The node sync signal is accompanied by the data of the address number assigned to each node, for example.

The node sync signal transmitted in each slot of the node sync area d2 is received and processed by each node in the network system. The processing of the transmission and receiving of the node sync signal will be described later.

In the data transfer area d3, the data transfer (transmission) processing is carried out between the respective nodes under the access control of the root node. The access control by the root node is executed by polling control from the root node, for example. The polling control process is carried out by calling each of the nodes sequentially with a polling response request signal thereby to execute the transmission sequentially for each node.

The node of the address designated by the polling response request signal, if it holds data to be transmitted, transmits the data immediately upon receipt of the polling response request signal. According to the type of data transmitted, the transmission processing may be divided into the data transfer in an asynchronous transfer mode and the data transfer in an isochronous transfer mode depending on the type of data to be transmitted. The asynchronous transfer mode is used for transmission of comparatively short data such as control data or the like, while the isochronous transfer mode is used for transmission of the data requiring real-time transfer such as video data, audio data or the like.

Now, the processing for transmission and receiving of the node sync signal will be explained with reference to FIG. 5. As described above, the node sync area d2 has 16 slots prepared. For facilitating the understanding, however, assume that eight slots are prepared including first to eighth slots and that the first to seventh slots of them are assigned individually to the seven nodes including the first to seventh nodes.

Figure 5A:
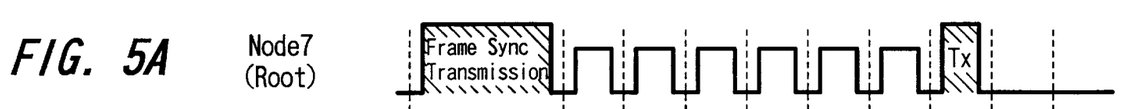
FIGS. 5A to 5G are each a timing chart showing an example processing in the node sync area according to the first embodiment of the invention.

The communication conditions of the seven nodes are shown in FIGS. 5A to 5G. The condition of the seventh node constituting the root node is shown in FIG. 5A. The conditions of the first to sixth nodes are shown in FIGS. 5B to 5G in that order. In FIG. 5, the shadowed regions show that the transmission processing is carried out at the radio processing section 32 making up the transmission means of a particular node and signals are sent by radio from the antenna 31. Other periods with rising like pulses represent the condition in which the signal transmitted from other nodes is properly received and processed at the radio processing section 32 constituting the receiving means of the node. The periods with no rising like a pulse, on the other hand, represents the condition in which the signal cannot be received correctly (i.e. the condition in which data cannot be decoded correctly after an attempt to receive).

First, in the root node, as shown in FIG. 5A, the frame sync signal is processed for transmission in the period of the frame sync area d1. In the period of the node sync area d2, the node sync signal is processed for transmission as designated by Tx in the period set as the seventh slot. In the other slots (the period of the first to sixth slots and the period of the eighth slot), on the other hand, the node sync signal is processed for receiving. In addition to the sync data required for frame processing for synchronization, the frame sync signal contains an ID number data unique to the network system and data on the topology map in the network. The topology map data are those data prepared previously by the control section 35 of the root node and stored in the internal memory 36 (the topology map prepared one frame before when it is prepared in one-frame period). The node sync signal includes, in addition to the address data attached to the seventh node data, the data on the communication condition of the seventh node. The root node, which is basically located in a position capable of receiving the signals from all the other nodes, can receive the signals transmitted in all the slots including the first to sixth slots and the eighth slot and correctly decodes the data contained in the signals. In the absence of the node assigned to the eighth slot, however, no data is received at the eighth slot.

The first to sixth nodes, as shown in FIGS. 5B to 5G, receive the frame sync signal transmitted from the root node and processes the transmission in the frame period designated by the particular signal. Specifically, with reference to the timing of receiving the frame sync signal, the control section 35 of each node controls the communication timing (by setting the timing of each area or slot, etc.). In this way, each node in the network system processes the signal for communication in the same frame period. The transmission condition of the frame sync signal is shown in A of FIG. 6. All the other nodes than the root node are located within an area a7 that can be reached by the signal sent from the root node (seventh node), so that the frame sync signal can be correctly received by all the nodes.

Figure 5B:
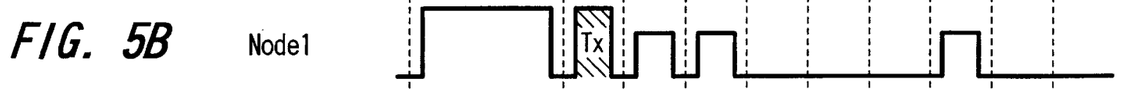

In the node sync area, the node sync signal is transmitted in the slot position assigned to each node, and the signal is processed for receiving in other slot positions. Specifically, as shown in FIG. 5B, the node sync signal is processed for transmission as designated by Tx in the first slot, and processed for receiving in the second to eighth slots. In this process, the second node, the third node and the seventh node are adjacent to the first node. The first node, as shown in FIG. 5B, can correctly receive only the node sync signals transmitted from these nodes to the second slot, the third slot and the seventh slot thereof. Also, the transmission of the node sync signal from the first node to the first slot is shown in B of FIG. 6. The second node, the third node and the seventh node are located in the area a1 that can be covered by the signal sent from the first node 1. Thus, the node sync signal from the first node 1 can be correctly received by the second node 2, the third node 3 and the seventh node 7.

Figure 5C:
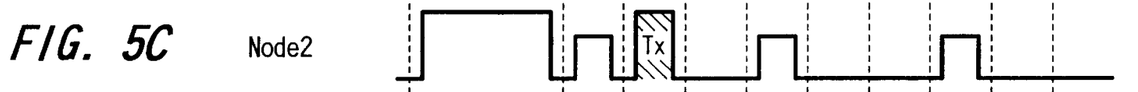

In the second node, as shown in FIG. 5C, the node sync signal is processed for transmission Tx as designated by the second slot, and processed for receiving in the first slot and third to eighth slots. The second node is adjacent to the first node, the fourth node and the seventh node at this time. The second node, as shown in FIG. 5C, can correctly receive only the node sync signals sent from these nodes to the first slot, the fourth slot and the seventh slot thereof. Also, the transmission condition of the node sync signal sent from the second node to the second slot is shown in C of FIG. 6. The first, fourth and seventh nodes are located in the area a2 capable of being reached by the signal sent from the second node 2. The node sync signal from the second node 2 can thus be received correctly by the first node 1, the fourth node 4 and the seventh node 7.

Figure 5D:
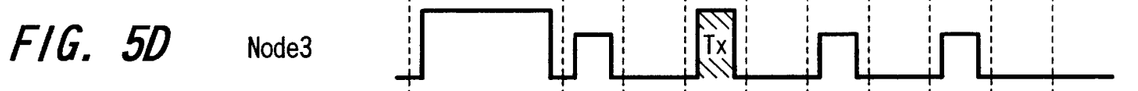

In the third node, as shown in FIG. 5D, the node sync signal is processed for transmission Tx in the third slot, and processed for receiving in the first and second slots and the fourth to eighth slots. The first node, the fifth node and the seventh node are adjacent to the third node at this time. In the third node, as shown in FIG. 5D, only the node sync signal sent from these nodes to the first slot, the fifth slot and the seventh slot can be correctly received. Also, the transmission condition of the node sync signal sent from the third node to the third slot is shown in D of FIG. 6. The first, fifth and seventh nodes are located in the area a3 capable of being reached by the signal sent from the third node 3. The node sync signal from the third node 3 can thus be received correctly by the first node 1, the fifth node 5 and the seventh node 7.

Figure 5E:
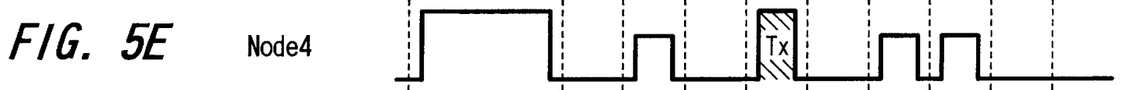

The fourth node, as shown in FIG. 5E, processes the node sync signal for transmission Tx in the fourth slot, and processes the signal for receiving in the first to third slots and the fifth to eighth slots. In the process, the nodes located adjacently to the fourth node include the second, sixth and seventh nodes. In the fourth node, as shown in FIG. 5E, only the node sync signal sent from these nodes to the second, sixth and seventh slots can be correctly received. Also, the transmission condition of the node sync signal sent from the fourth node to the fourth slot is shown in E of FIG. 6. The second, sixth and seventh nodes are located in the area a4 capable of being reached by the signal sent from the fourth node 4. The node sync signal from the fourth node 4 can thus be received correctly by the second node 2, the sixth node 6 and the seventh node 7.

Figure 5F:
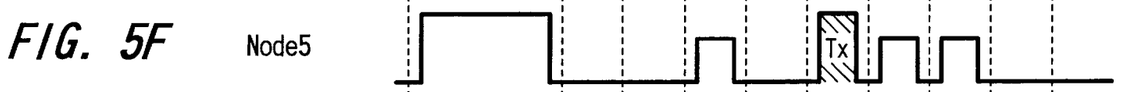

In the fifth node, as shown in FIG. 5F, the node sync signal is processed for transmission Tx in the fifth slot, and processed for receiving in the first to fourth slots and the sixth to eighth slots. The nodes located adjacently to the fifth node are the third, sixth and seventh nodes in this process. In the fifth node, as shown in FIG. 5F, only the node sync signal sent from these nodes to the third, sixth and seventh slots can be correctly received. Also, the transmission condition of the node sync signal sent from the fifth node to the fifth slot is shown in F of FIG. 6. The third, sixth and seventh nodes are located in the area a5 capable of being reached by the signal sent from the fifth node 5. The node sync signal from the fifth node 5 can thus be received correctly by the third node 3, the sixth node 6 and the seventh node 7.

Figure 5G:
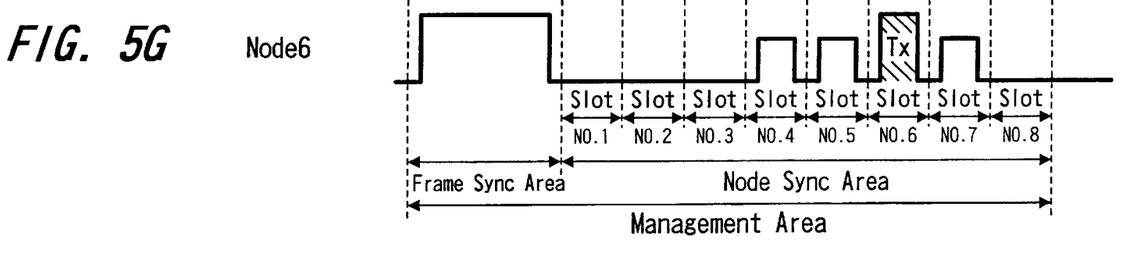
Figure 6:
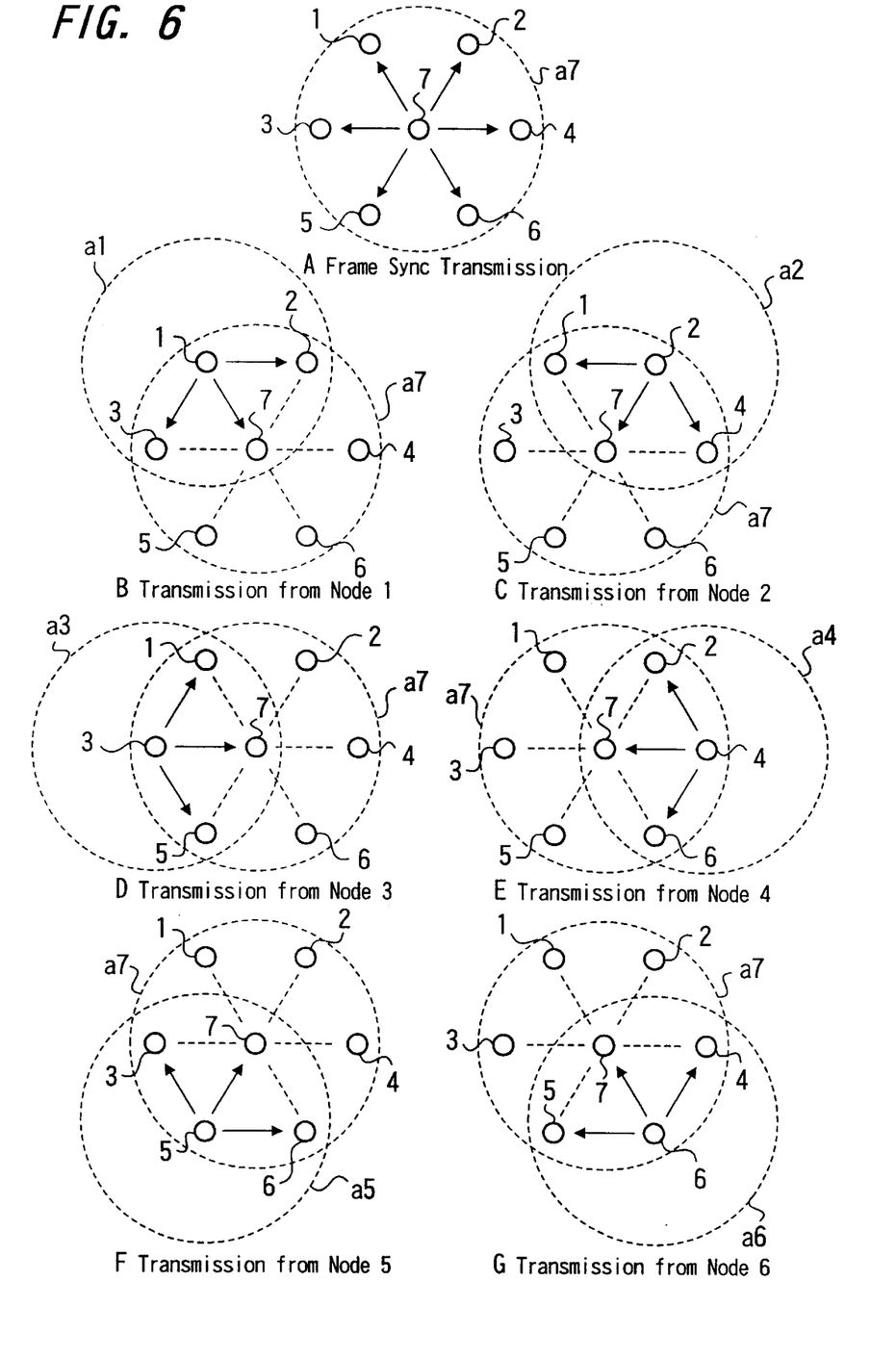
FIG. 6 is a diagram for explaining an example of the transmit/receive operation at each timing according to the first embodiment of the invention.

In the sixth node, as shown in FIG. 5G, the node sync signal is processed for transmission Tx in the sixth slot, and processed for receiving in the first to fifth slots, the seventh slot and the eighth slot. The nodes located adjacently to the sixth node include the fourth, fifth and seventh nodes at this time. In the sixth node, as shown in FIG. 5G, only the node sync signal sent from these nodes to the fourth, fifth and seventh slots can be correctly received. Also, the transmission condition of the node sync signal sent from the sixth node to the sixth slot is shown in G of FIG. 6. The fourth, fifth and seventh nodes are located in the area a6 capable of being reached by the signal sent from the sixth node 6. The node sync signal from the sixth node 6 can thus be received correctly by the fourth node 4, the fifth node 5 and the seventh node 7.

Figure 7:
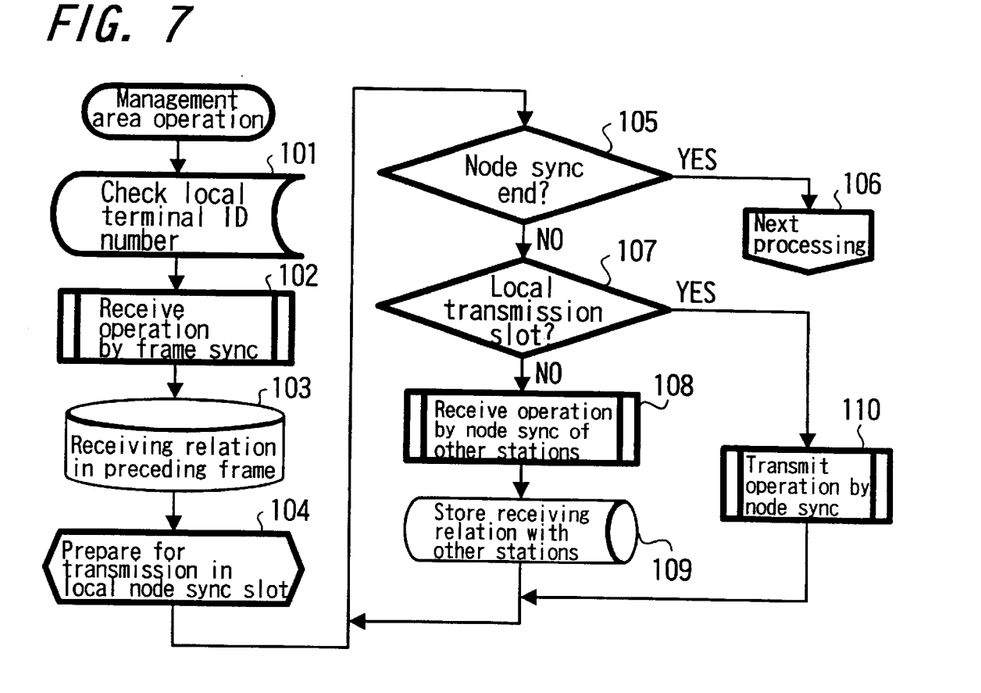
FIG. 7 is a flowchart showing an example operation in the management area of each node according to the first embodiment of the invention.

Now, the processing of the management area (i.e. the frame sync area and the node sync area) of each node (other than the root node) for transmission of the sync signal will be explained with reference to the flowchart of FIG. 7. The first step of processing the management area of each node is to check the address ID number assigned to the local terminal (node) (step 101). After that, the frame sync signal is received (step 102), so that the control section 35 determines the timing synchronized with the frame sync signal thus received. The control section 35 then reads from the internal memory 36 the data on the receiving condition received and stored in the management area of the preceding frame (step 103), and the preparation is made under the control of the control section 35 for transmitting the data on the receiving condition thus read (step 104).

Upon complete preparation for transmission, the process determines whether the node sync area has ended or not (step 105). Since the node sync area has not ended in the initial state, the process proceeds to step 107, in which the control section 35 determines whether the slot timing for transmission from the local office has arrived or not (step 107). In the case where the slot timing for transmission from the local station has arrived, the radio processing section 32 is caused to process for transmission the node sync signal containing the data on the receiving condition prepared in step 104 (step 110). Then, the process returns to step 105 for determination. In the case where it is determined in step 107 that the slot timing for transmission from the local station has not arrived, the node sync signal transmitted from other station is received (step 108), and the particular receiving condition or (whether or not the transmitted data could be correctly received and decoded) is determined by the control section 35. The data on the receiving condition is stored temporarily in the internal memory 36 (step 109), and the process returns to step 105 for determination.

In the case where it is determined in step 105 that the node sync area has ended, the process proceeds to the next step (i.e. the process for transmission in the data transfer area) (step 106). In the case where it is determined in step 105 that the node sync area has ended, it indicates that the processing for receiving all the node sync signals transmitted from the other stations has been completed. Thus, the data on the receiving condition of the signals transmitted from all the other nodes in the network system are stored in the memory 36. These data on the receiving condition of the signals from each node stored in the memory 36 are read out in step 103 at the time of operation in the management area of the next frame.

Figure 9:
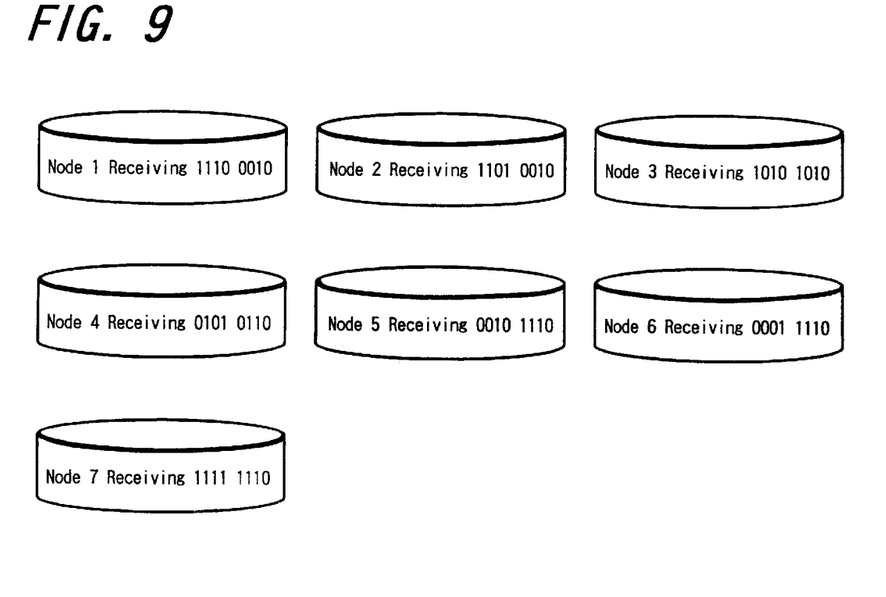
FIG. 9 is a diagram for explaining an example data received and accumulated by each node according to the first embodiment of the invention.

An example is shown of the data on the receiving condition stored in the memory 36 of each node at the time point when the node sync area has ended. For example, the data on the receiving condition as shown in FIG. 9 are stored in each one of the first to seventh nodes (the root node is also processed the same way in this case). Each node is represented by eight bit data, the position of which corresponds to each node. A node that can be received correctly is represented by "1" data, and a node that cannot be received correctly is represented by "0" data, respectively. In the shown example, however, there are seven nodes and therefore the last bit is always "0" data.

Figure 8:
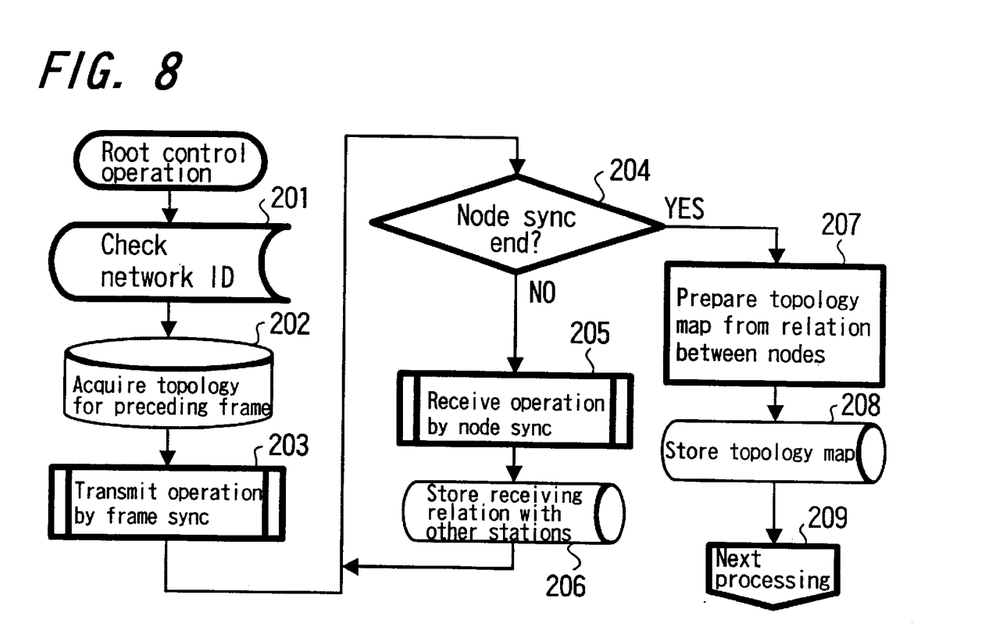
FIG. 8 is a flowchart showing an example operation in the management area of a root node according to the first embodiment of the invention.

Next, the processing in the management area (i.e. the frame sync area and the node sync area) of the root node will be explained with reference to the flowchart of FIG. 8. The first step of processing in the management area of the root node is to check the system ID number attached to the network system (step 201). Then, the topology map data produced by the control section 35 and stored in the memory 36 in the preceding frame are read out (step 202), and the frame sync signal containing the topology map data, the system ID data or the like is processed for transmission from the radio processing section 32 (step 203). Upon completion of the transmission processing, it is determined whether the node sync area has ended or not (step 204). Since the node sync area has not ended in the initial state, the process proceeds to step 205, where the node sync signal transmitted from each node is processed for receiving by the radio processing section 32. At the same time, the radio processing section 32 processes for transmission the node sync signal at the slot position assigned to the local station. The data on the receiving condition of each station contained in the received node sync signal are temporarily stored in the memory 36 as determined by the control section 35 (step 206).

Upon completion of the processing of step 206, the process returns to step 204 for determination. In the case where it is determined in step 204 that the node sync area has, ended, the process proceeds to step 207, where the control section 35 produces the topology map of the network system based on the receiving condition data between the respective nodes stored in the memory 36 in step 206 (step 207), the topology map data are stored in the memory 36 (step 208), and then the process proceeds to the next step (access control processing in the data transfer area) (step 209). At the time of access control processing, the node pairs capable of mutual direct communication or the node pairs requiring a relay for communication are determined with reference to the data of the latest topology map stored in the memory 36, and a corresponding communication condition is set up by access control. The latest topology map data stored in step 209 is read in step 202 at the time of processing in the management area of the next frame and transmitted as a frame sync signal.

Figure 10:
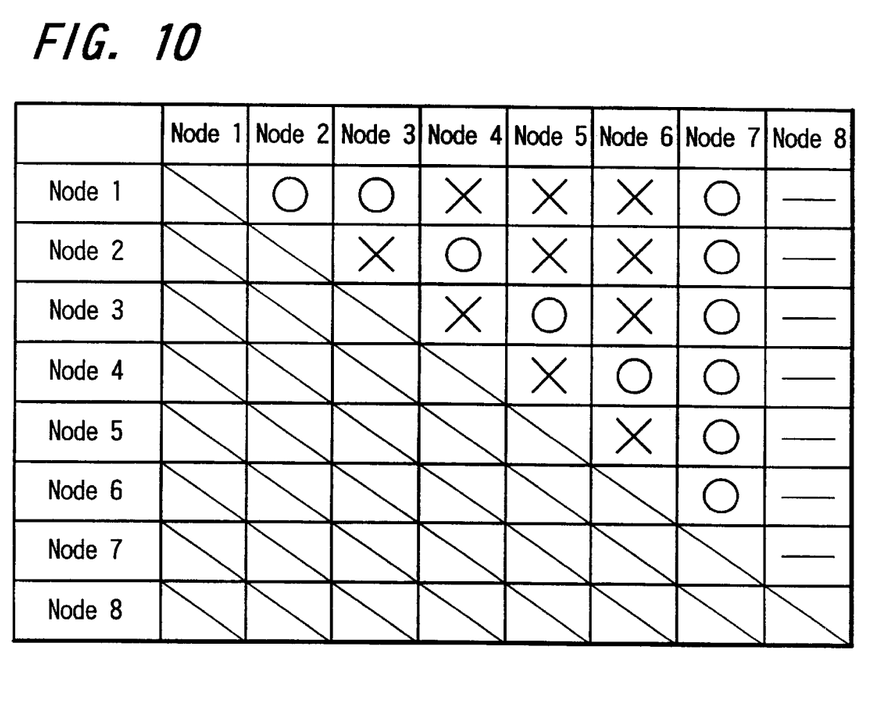
FIG. 10 is a diagram for explaining an example of a topology map according to the first embodiment of the invention.

FIG. 10 shows an example of the topology map. As many nodes as prepared in the system are set along each of the ordinate and the abscissa. The data as to whether or not the communication can be correctly carried out between a given pair of nodes are written at the position connecting the particular pair of nodes. Here, the position designated by ○ represents the node pair that can communicate correctly, and the position indicated by X represents the node pair between which correct communication is impossible. The example shown in FIG. 10 assumes that the communication condition from one node to the other is the same as the communication condition in the reverse way, and one communication condition data is assigned to each node pair. As an alternative, it can be determined whether the communication is possible or not based on the communication condition in each of the two directions, and thus a more detailed topology map can be prepared.

By carrying out the processing described above for this embodiment, each node can detect the communication condition with the other nodes (the signal receiving condition from the other nodes) in the network efficiently by use of the node sync area providing the management area. Also, the communication condition data thus detected can be transmitted to the root node in the management area of the next frame. At the root node, upon receipt of the signal of all the slots in the node sync area, the topology map for the network system can be easily prepared. Specifically, the root node can prepare a topology map sequentially for each frame period. Even in the case where a given node is a movable station, for example, the access control is made possible based on the prevailing communication condition. Especially, the root node can accurately determine whether a node pair requiring mutual transmission is capable of direct radio transmission with each other or requires a relay of a third-party node. Thus, accurate access control is possible.

In the embodiment described above, the node sync signal transmitted between the nodes in the slots of the node sync period is used only for determining whether communication is possible or not. Nevertheless, the node sync signal can be used for more detailed determination. For example, a dormant node with the radio transmission unit (or the processing unit connected to the transmission unit) thereof in off state or totally lacking the data to be transmitted for a long time is determined from the receiving condition of the respective node. Then the data of the dormant node is added to the node sync signal and transmitted to the root node. In this way, the data of a dormant node (or a node estimated to be currently located outside the network) can be added to the topology map prepared by the root node.

Even in the case where the data transmitted in the node sync signal from each node lacks such dormancy data, the root node can determine that a specific node of the network is dormant when the data transmitted from all the nodes of the network indicate that the signal from the specific node cannot be received at all. The root node then adds the data of the dormant node to the topology map. In the example of FIG. 10, assume that the eighth node exists, for example. The root node determines that the signal from the eighth node cannot be received by any other node, and the fact that the eighth node is dormant is indicated in the topology map (indicated by horizontal lines in this topology map).

Now, a second embodiment of the present invention will be explained with reference to FIG. 11.

This embodiment, like the first embodiment described above, is used with a network system configured to transmit and receive video data, audio data, computer data or the like within a home, a comparatively small office or the like. The configuration of the network system of this embodiment, therefore, is similar to the one described in the first embodiment (the configuration shown in FIG. 1, for example). Specifically, according to this embodiment, a network system is configured of a predetermined number of radio transmission units each connected with a video signal reproduction unit, a monitor unit, a computer unit, a printer unit and the like processing device. In the case where data transmission, whenever required between these processing devices, is carried out through the radio transmission unit connected thereto. In what is called a star-connected configuration, each radio transmission unit functions as a node constituting a communication station, and the radio transmission unit arranged substantially at the center of the network system functions as a root node for controlling the other nodes around it.

The basic configuration of the radio transmission unit making up each node is also identical to the configuration described in the first embodiment (the configuration shown in FIG. 3, for example), and therefore will not be described.

Figures 11A, 11B:
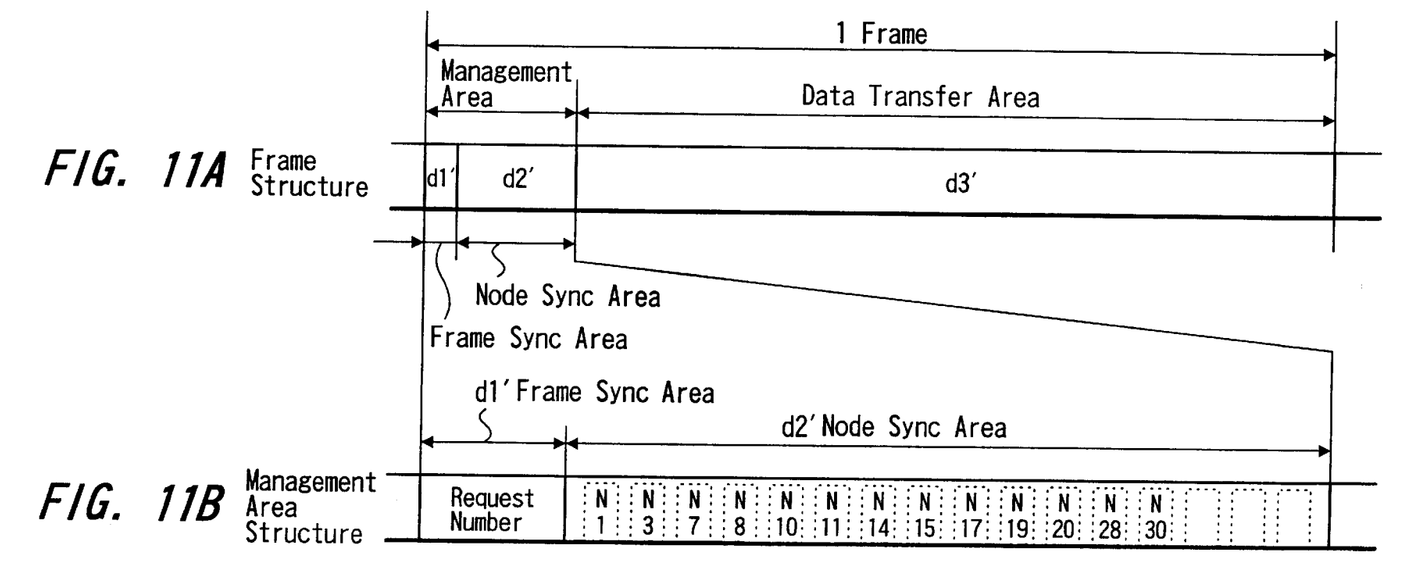
FIGS. 11A and 11B are each a diagram for explaining an example structure of transmission data according to a second embodiment of the invention.

According to this embodiment, the signal transmitted between the nodes in the network system has a structure as shown in FIG. 11, for example. Specifically, as shown in FIG. 11A, a predetermined period defines one frame period, the head of which contains a frame sync area d1' and a node sync area d2' constituting a management data transmission area in a predetermined period, and the remaining period is defined as a data transfer (transmission) area d3'. In the frame sync area d1', as shown in FIG. 11B, a frame sync signal is transmitted from the root node. This frame sync signal is received by the other nodes, and with the timing of receiving this sync signal as a reference, the frame period is set for all the nodes. The frame sync signal, which is configured of data of a predetermined number of bits, carries an ID number unique to the network system, for example, the data of the topology map prepared by the root node and the request number data for determining the slot assignment of the node sync area. The request number data will be described later.

A predetermined number (16 in the present case) of slots are set equidistantly in the node sync area d2. The 16 slots in one frame are assigned to the respective nodes based on the request number data in the frame sync area so that the node sync signal is transmitted from the assigned node. The node sync signal is attached with the address number data given to each node and the data on the receiving condition at each slot position of the node sync area for the immediately preceding several frames (the number of the frames is required to coincide with the frame period of the address number data, for example). The node sync signal transmitted in each slot of the node sync area d2' is processed for receiving at the other nodes in the network system, and based on this receiving condition, the data on the receiving condition in the node sync area described above is generated.

The relation between the request number data in the frame sync area and the slot assignment for the node sync area will be explained. The request number data is configured of data about several bits, for example, and the same number data are repeatedly assigned at an interval of a predetermined number of frame periods. Assume, for example, that the request number data is configured of 4-bit data and one period includes seven frames. Different data "1010", "0011", "0110", "1011", "0000", "0001" and "0100" are attached to the seven frames. This data arrangement is repeated at each interval of seven frames. The slot assignment for each request number data is determined in advance in the system, so that the nodes prepared in the system are assigned uniformly by one period of request number data.

The most simple example of slot assignment based on the request number data will be explained. Assume, for example, that 32 nodes of a maximum are prepared in the network system and 16 slots are arranged in the node sync area of one frame. In a method conceivable for this case, two types of number data as request number data are prepared, so that the nodes of odd address numbers are assigned to the slots sequentially for the first request number and the nodes of even address numbers are assigned to the slots sequentially for the second request number.

In the case shown in FIG. 11B, assume that a specific request number is attached to the frame sync area d1'. The first node N1, the third node N3, the seventh node N7, the eighth node N8 and so on, are assigned to 13 slots of the 16 slots prepared in the node sync area d2'. The remaining three slots are not assigned with any node. When another request number is designated, slots are assigned differently from that shown in FIG. 11B.

In the data transfer area d3', the data transfer (transmission) between the nodes is processed under the access control of the root node. An example of the access control carried out by the root node is the polling control from the root node. The polling control processing is carried out by calling the nodes sequentially in accordance with the polling response request signal from the root node and the transmission is accomplished sequentially node by node.

The node having an address designated by a polling response request signal, if it has data to be transmitted, processes for transmission of the data immediately upon receipt of the polling response request signal. The transmission processing for data transmission can be divided into the asynchronous transfer mode and the isochronous transfer mode in accordance with the type of data to be transmitted. The asynchronous transfer mode is used for transmission of comparatively short data such as control data or the like, and the isochronous transfer mode is used for transmission of the data required to be transferred at real time such as video data, audio data and so on.

As a result of this transmission processing, the root node can receive the node sync signal at least once from each node in the network system upon the lapse of the frame period making a round of the request number data. Thus, a topology map can be produced from the data on the receiving condition of the nodes included in the node sync signal, and the communication can be controlled based on the topology map thus produced. Also, the topology map data can be reported to each node as the data included in the frame sync signal.

The configuration and processing for the remaining parts of this embodiment are similar to those for the first embodiment described above.

As a result of the processing according to this embodiment described above, each node, like in the first embodiment, can detect the communication condition (the receiving condition of the signal from the other nodes) of other nodes in the network efficiently using the node sync area providing the management area. The data on the communication condition thus detected can be transmitted to the root node at the slot position assigned to the local station in the subsequent frames. The root node, on the other hand, receives the signals of all the slots in the node sync area and thus can easily produce a topology map in the network system. The root node thus can produce a topology map sequentially at a predetermined frame period. Even in the case where the respective nodes are movable stations, for example, the access control based on the prevailing communication condition is possible.

In the present embodiment, the slots of the node sync area are assigned variably based on the request number data supplied from the root node. Therefore, even when the number of nodes (number of transmission units) arranged in the network system exceeds the number of slots in the node sync area of one frame, the requirement can be met. Thus, the number of nodes in the network system is not limited.

Also in the second embodiment, in the case where a topology map is produced by the root node based on the data transmitted in the node sync area, dormant nodes as well as the node pairs capable of direct mutual communication and the node pairs incapable of direct mutual communication can be determined and indicated in the topology map.

Further, the frame structure described in the first and second embodiments is nothing but a preferred example, and is not limitative, and various frame structures can be used for the transmission schemes of the network system. For example, instead of arranging the frame sync area and the node sync area at the head of the frame as in the above-mentioned cases, they can be arranged at other positions in the same frame.

The embodiments described above are so configured that the node sync signal is transmitted in all the frames. As an alternative, only one node sync area can be provided for each predetermined number of frames for transmitting the node sync signal.

According to the communication control method described, the data on the communication condition of each communication station can be collected in a communication using the management data transmission area. Thus, the control station can perform access control properly based on the data thus collected.

According to the communication control method described, the data on the communication condition in the invention is the data as to whether or not direct communication is possible with other communication stations or the control station. In the case where the control station controls the communication between the respective stations, whether direct transmission is possible or a relay station is required for transmission can be accurately determined, thereby making possible superior communication control.

According to the communication control method described, the data on the communication condition in the invention further include the data on a dormant communication station. Thus the transmission to the dormant communication station can prohibited to prevent any transmission error which might be caused in the data transmission to the dormant communication station.

According to a communication control method described, other communication stations or the control station is caused to receive the data transmitted from the slots in the management transmission area in the invention described, and based on this receiving condition, the data is generated on the communication condition for transmission from each communication station or the control station at the next transmission timing. As a result, the communication condition of each station can be determined upon receipt of the data transmitted in the slots in the management data transmission area from each station. At the same time, the communication condition with each station can be determined by detecting the receiving condition of the data, thereby making efficient processing possible.

According to the communication control method described, the data on the communication condition from each station in the invention described are received and totalized by the control station, to thereby produce a topology map on the communication conditions between the respective stations. The topology map data thus produced are transmitted to each station by broadcasting. Each station in the network system can thus determine the internal communication conditions in the network system based on the topology map data thus broadcasted.

According to the communication control method described, the data on the slot assignment of each communication station are transmitted in the management data transmission area in accordance with the data transmitted from the control station, and each communication station determines the slot position assigned to the same station based on such data. In this way, the slot assignment can be changed at a frame period, for example, and the slots prepared in the management data transmission area can be efficiently assigned to a plurality of communication stations and can be used for the communication control processing.

According to the transmission unit described, signals from other transmission systems can be processed for receiving by using the management data transmission area and the data on the communication condition can be processed for transmission based on the receiving condition of the signals received. Thus, any one of the transmission units in the network system can properly control the communication condition using the data transmitted in the management data transmission area.

According to a transmission unit described, the data on the communication condition in the invention described are the data as to whether or not direct communication is possible with other transmission units in each slot. In the case of communication with other transmission units, therefore, it is possible to accurately determine based on the data whether direct transmission is possible or a relay station is required for transmission, and therefore to set a superior communication condition free of transmission error.

According to the transmission system described, the data on the communication condition in the invention further include the data on a dormant transmission unit as the data on the communication condition. The processing for transmission to the dormant transmission unit is prohibited, thereby making it possible to prevent the transmission error which might occur in the data transmission to the dormant transmission unit.

According to the transmission unit described, the receiving means in the invention generates data on the communication condition based on the receiving condition received in the management data transmission area of a predetermined frame period. The data on the communication condition generated are transmitted from the transmission means in a predetermined slot of the management data transmission area of the subsequent frame period. Thus, the communication condition of other transmission units can be determined from the data transmitted in each slot of the management data transmission area, while at the same time determining the communication condition between the local transmission unit and other transmission units from the receiving condition of the signal in each slot, thereby making it possible to determine the communication condition efficiently.

According to the transmission unit described, the invention described further comprises a control means for producing a topology map on the communication condition between the transmission units in a network based on the data on the communication condition received by the receiving means in each slot in the management data transmission area. The topology map data thus produced are transmitted to other transmission units in the management data transmission area, so that each transmission unit in a network system can determine the prevailing communication condition in the network system based on the topology map data thus transmitted.

According to the transmission unit as described, the data on the slot assignment of each transmission unit in the network are transmitted by the transmission means in the invention described. It is thus possible to change the slot assignment in a frame period, for example, and the slots prepared in the management data transmission area can be efficiently assigned to a plurality of communication stations for carrying out the processing required for communication control.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed:

1. A communication control method for controlling an access of radio communications among a plurality of communication stations by a control station, comprising the steps of:

defining a frame period by a synchronizing signal transmitted from a predetermined station;

setting a management data transmission area in said frame period; and arranging in said management data transmission area a plurality of time slots assigned to said plurality of communication stations, wherein each of said plurality of time slots of said management data transmission area contains data on a communication condition of a respective one of said plurality of communication stations, and each of said plurality of communication stations transmits on an assigned time slot of said plurality of time slots of said management data transmission area said data on said communication condition and receives data sent from an other communication station on an other time slot of said management data transmission area.

2. The communication control method according to claim 1, wherein said data on said communication condition are data on whether direct communication with one of each of said communication stations and said control station is possible.

3. The communication control method according to claim 2, wherein said data on said communication condition further includes data on a dormant communication station.

4. The communication control method according to claim 1, wherein one of said communication stations and said control station receives data transmitted in each of said plurality of time slots of said management data transmission area, and one of said plurality of communication stations and said control station generates data on a communication condition for transmission at a next transmission cycle based on said received data.

5. The communication control method according to claim 4, wherein said data on said communication condition of each of said communication stations are received and totalized by said control station to produce a topology map on communication conditions between respective ones of said communication stations, and said topology map thus produced is broadcasted to each of said plurality of communication stations.

6. The communication control method according to claim 1, wherein data on slot assignments for each of said plurality of communication stations are transmitted in said data transmitted by said control station in said management data transmission area, and each of said communication stations determines a slot position assigned to itself based on said data on said slot assignments.

7. A transmission unit including a plurality of communication stations for carrying out communications under a control of a predetermined control unit, comprising:
   timing setting means for setting a frame period based on a predetermined synchronizing signal and for setting a management data transmission area having a plurality of time slots assigned to said plurality of communication stations in said frame period;
   receiving means for receiving a signal transmitted from said plurality of communication stations in each respective time slot of said management data transmission area; and
   transmission means for transmitting data on a receiving condition of each of said plurality of communication stations, wherein
   each of said plurality of time slots of said management data transmission area contains data on a communication condition of a respective one of said plurality of communication stations, and
   each of said plurality of communication stations transmits on an assigned time slot of said plurality of time slots of said management data transmission area said data on said communication condition and receives data sent from an other communication station on an other time slot of said management data transmission area.

8. The transmission unit according to claim 7, wherein said data on said communication condition are data on whether direct communication is possible with said plurality of communication stations.

9. The transmission unit according to claim 8, wherein said data on said communication condition further includes data on a dormant communication station.

10. The transmission unit according to claim 7, wherein said data on said communication condition are generated based on said receiving condition received by said receiving means in said management data transmission area of said frame period, and said data on said communication condition are transmitted by said transmission means in a subsequent frame period.

11. The transmission unit according to claim 10, further comprising control means for producing a topology map based on said communication condition between respective communication stations forming a network and on said data on said communication condition received by said receiving means in each respective slot of said management data transmission area,
   wherein said topology map generated by said control means is transmitted in said management data transmission area to said plurality of communication stations by said transmission means.

12. The transmission unit according to claim 11, wherein said transmission means transmits data on a slot assignment of said communication stations forming said network.

* * * * *